(12) United States Patent
Nguyen

(10) Patent No.: US 9,540,561 B2
(45) Date of Patent: Jan. 10, 2017

(54) METHODS FOR FORMING HIGHLY CONDUCTIVE PROPPED FRACTURES

(75) Inventor: Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 259 days.

(21) Appl. No.: 13/597,597

(22) Filed: Aug. 29, 2012

(65) Prior Publication Data

US 2014/0060829 A1 Mar. 6, 2014

(51) Int. Cl.
  *E21B 43/267* (2006.01)
  *C09K 8/80* (2006.01)
  *C09K 8/88* (2006.01)
  *C09K 8/92* (2006.01)

(52) U.S. Cl.
  CPC ............. *C09K 8/80* (2013.01); *C09K 8/805* (2013.01); *C09K 8/88* (2013.01); *C09K 8/92* (2013.01)

(58) Field of Classification Search
  CPC .................................................. E21B 43/267
  See application file for complete search history.

(56) References Cited

U.S. PATENT DOCUMENTS

| | | | |
|---|---|---|---|
| 3,608,639 A * | 9/1971 | Hart | E21B 43/267 166/295 |
| 4,585,064 A | 4/1986 | Graham et al. | |
| 4,670,501 A | 6/1987 | Dymond et al. | |
| 5,249,627 A | 10/1993 | Harms et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,977,031 A | 11/1999 | Patel | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,582,819 B2 | 6/2003 | McDaniel et al. | |
| 6,677,426 B2 | 1/2004 | Noro et al. | |
| 6,828,279 B2 | 12/2004 | Patel et al. | |
| 7,153,575 B2 | 12/2006 | Anderson et al. | |
| 7,392,847 B2 | 7/2008 | Gatlin et al. | |
| 7,534,745 B2 | 5/2009 | Taylor et al. | |
| 7,645,723 B2 | 1/2010 | Kirsner et al. | |

(Continued)

FOREIGN PATENT DOCUMENTS

| | | |
|---|---|---|
| EP | 2418263 A1 | 2/2012 |
| WO | 2013070082 A1 | 5/2013 |
| WO | 2014/035724 A1 | 3/2014 |

OTHER PUBLICATIONS

International Search Report and Written Opinion for PCT/US2013/055720 dated Nov. 20, 2013.

*Primary Examiner* — Angela M DiTrani
*Assistant Examiner* — Andrew H Sue-Ako
(74) *Attorney, Agent, or Firm* — McDermott Will & Emery LLP; Craig Roddy

(57) ABSTRACT

Methods of propping subterranean fractures using swellable particulates. Some methods alternate the placement into a fracture of proppant and swellable particulates. Other methods alternate the placement into a fracture of proppant-free fluid and swellable particulates. Still other methods combine proppant and swellable particulates into a single fluid and place that fluid into a subterranean fracture. The methods are useful for treatment of low closure stress formations.

6 Claims, 3 Drawing Sheets

(56) References Cited

U.S. PATENT DOCUMENTS

| | | |
|---|---|---|
| 7,673,686 B2 | 3/2010 | Nguyen et al. |
| 7,696,131 B2 | 4/2010 | Oyler et al. |
| 7,819,192 B2 | 10/2010 | Weaver et al. |
| 7,825,074 B2 | 11/2010 | Schmidt et al. |
| 7,956,017 B2 | 6/2011 | Gatlin et al. |
| 8,003,579 B2 | 8/2011 | Akarsu et al. |
| 8,012,914 B2 | 9/2011 | Welton |
| 2005/0274517 A1 | 12/2005 | Blauch et al. |
| 2005/0274523 A1 | 12/2005 | Brannon et al. |
| 2005/0277554 A1 | 12/2005 | Blauch et al. |
| 2006/0151170 A1* | 7/2006 | Brannon et al. ........... 166/280.2 |
| 2006/0180308 A1 | 8/2006 | Welton et al. |
| 2006/0180309 A1 | 8/2006 | Welton et al. |
| 2006/0181310 A1 | 8/2006 | Rhee |
| 2006/0183646 A1 | 8/2006 | Welton et al. |
| 2007/0131422 A1 | 6/2007 | Gatlin et al. |
| 2007/0131425 A1 | 6/2007 | Gatlin et al. |
| 2007/0181224 A1* | 8/2007 | Marya et al. ................ 148/400 |
| 2007/0289781 A1 | 12/2007 | Rickman et al. |
| 2008/0006405 A1 | 1/2008 | Rickman et al. |
| 2008/0017376 A1 | 1/2008 | Badalamenti et al. |
| 2008/0066910 A1 | 3/2008 | Alary et al. |
| 2008/0073082 A1* | 3/2008 | Thiercelin ............. E21B 43/261 |
| | | 166/280.1 |
| 2008/0142222 A1 | 6/2008 | Howard et al. |
| 2009/0044945 A1* | 2/2009 | Willberg et al. ........... 166/308.1 |
| 2009/0120647 A1 | 5/2009 | Turick et al. |
| 2009/0176667 A1 | 7/2009 | Nguyen |
| 2009/0294126 A1 | 12/2009 | Dalrymple et al. |
| 2010/0096334 A1 | 4/2010 | Edmiston |
| 2010/0147507 A1 | 6/2010 | Korte et al. |
| 2010/0160187 A1 | 6/2010 | Nguyen et al. |
| 2010/0179281 A1 | 7/2010 | Nilsen |
| 2010/0212898 A1 | 8/2010 | Nguyen et al. |
| 2010/0280210 A1 | 11/2010 | Kitamura et al. |
| 2010/0314115 A1 | 12/2010 | Moradi-Araghi et al. |
| 2011/0030950 A1 | 2/2011 | Weaver et al. |
| 2011/0039737 A1 | 2/2011 | Schmidt et al. |
| 2011/0098394 A1 | 4/2011 | Schmeltzer et al. |
| 2013/0312962 A1* | 11/2013 | Weaver ................. C09K 8/805 |
| | | 166/280.1 |

* cited by examiner

METHODS FOR FORMING HIGHLY CONDUCTIVE PROPPED FRACTURES

BACKGROUND

The present invention relates to methods for enhancing the conductivity of propped fractures in low closure stress subterranean formations.

Non-traditional sources of hydrocarbons are playing an increasingly important role in the oil and gas industry. Such non-traditional sources include gas hydrates, heavy oil, bitumen, and coal bed methane (CBM). Coal bed methane in particular is becoming an increasingly important energy source, with the total coal bed methane reserves in the United States estimated to be between 400 and 850 trillion cubic feet.

Typically, CBM can be found unexploited at relatively shallow depths, and because methane is stored in coal by a different means than conventional gas, more gas per unit volume can be recovered at these shallow depths. In order to extract hydrocarbons from the coal seam, the casing and cement sheet are perforated to create production intervals through which hydrocarbons can flow into the wellbore and ultimately to the surface. To enhance hydrocarbon production, the production intervals are often stimulated by a variety of methods that have been developed and used successfully for increasing the production of CBM from coal seams.

Stimulation operations may involve hydraulic fracturing, acidizing, fracture acidizing, or combinations thereof. Hydraulic fracturing generally includes injecting or pumping a viscous fracturing fluid into a portion of the subterranean formation at a rate and pressure such that fractures are formed or enhanced into the portion of the subterranean formation. The fracture pressure causes the formation to crack which allows the fracturing fluid to enter and extend the crack further into the formation. The fractures tend to propagate is vertical and/or horizontal cracks located radially outward from the well bore.

In such fracturing treatments once the fracturing pressure is released the fractures tend to close, thereby removing at least a portion of the conductivity gained through the fracturing operation. To at least partially prevent closure proppant is generally disposed into the fractures before the fracturing pressure is released. In this way conductive channels remain between the proppant particles in the face of the fracture hydrocarbons to produce from the formation into the well bore.

However, these traditional fracture and propping operations are not specifically suited for use in formations, such as shale and coal bed methane formations wherein the formation itself exhibits a layered structure and fracture "closure" can refer not only to the closure of fracture faces together, but to the closure of individual layers of the formation structure itself.

SUMMARY OF THE INVENTION

The present invention relates to methods for enhancing the conductivity of propped fractures in low-closure stress subterranean formations.

Some embodiments of the present invention provide methods comprising: providing a first treatment fluid that comprises proppant; providing a second treatment fluid that comprises swellable particulates; alternating the placement of the first treatment fluid and the second treatment fluid into a fracture within a low closure stress formation.

Other embodiments of the present invention provide methods comprising: providing a first treatment fluid that is proppant-free; providing a second treatment fluid that comprises swellable particulates; alternating the placement of the first treatment fluid and the second treatment fluid into a fracture within a low closure stress formation.

Still other embodiments of the present invention provide methods comprising: providing a treatment fluid that comprises proppant and swellable particulates; placing of the treatment fluid into a fracture within a low closure stress formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
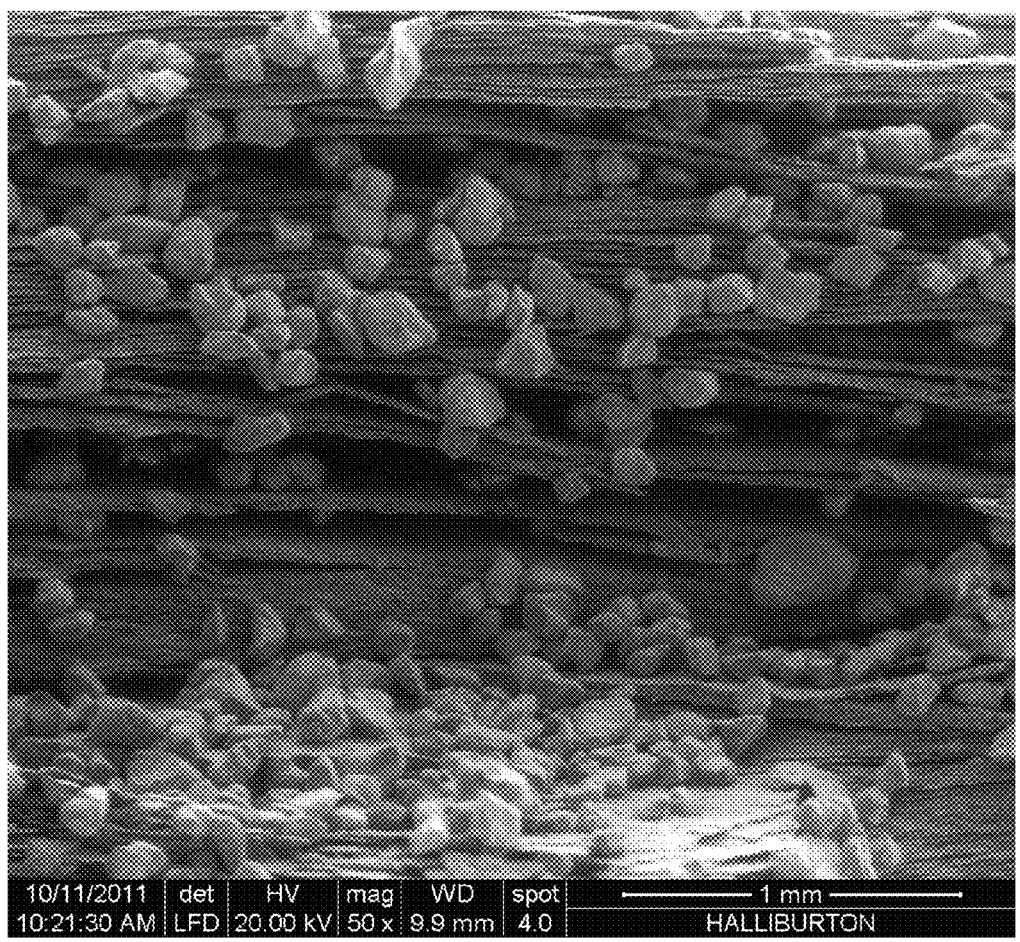
FIGS. 1A-C provide SEM images perpendicular to the bedding planes of tackified shale after exposure to proppant particles.

The present invention relates to methods for enhancing the conductivity of propped fractures in low closure stress subterranean formations.

The embodiments of the present invention provide methods of propping fractures in low closure stress subterranean formations. As used herein, the term "low closure stress" refers to formations having closure stresses less than about 2,000 psi. In some embodiments the closure stress of the formation being treated may be less than about 1,750, about 1,500 psi, about 1,250 psi, or less than about 1,000 psi. In some embodiments, the methods comprise using a proppant-containing treatment fluid in alternating stages with a treatment fluid containing swellable particulates. In other embodiments, the methods comprise using a proppant-free treatment fluid in alternating stages with a treatment fluid containing swellable particulates. In still other embodiments, the methods comprise using a treatment fluid comprising both proppant and swellable particulates in a single fluid.

The use of swellable particulates together with traditional proppant enhances well production when compared to treatments that use traditional proppant alone. Without being constrained by theory, it is believed that as the swellable particulates encounter the formation downhole, they tend to wedge in the crevices between the formation layers. Then, when they expand, they cause the layers to expand as well, further opening the flow paths.

Treatment Fluids

Any suitable treatment fluid that may be employed in subterranean operations may be used in accordance with the present invention, including aqueous gels, oil-based fluids, viscoelastic surfactant gels, and emulsions. While non-aqueous fluids can be used, one of skill in the art will recognize that some low closure stress formations, such as coal bed methane formations, are unsuitable for oil-based fluids because they tend to block the water exiting the formation thereby trapping the gas. Where desirable, the selected carrier fluid may be foamed by the addition of a gas, such as carbon dioxide or nitrogen. Where the methods describe the use of alternating treatment fluids, the treatment fluid containing swellable particulates may be the same or different than the proppant-containing treatment fluid or the proppant-free treatment fluid.

Suitable aqueous gels are generally comprised of water and one or more gelling agents. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof. In some embodiments of the present invention, the carrier fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, carrier fluid, inter alia, reduces fluid loss and allows the carrier fluid to transport proppants.

Suitable oil-based fluids may include alkanes, olefins, aromatic organic compounds, cyclic alkanes, paraffins, diesel fluids, mineral oils, desulfurized hydrogenated kerosenes, and any combination thereof. Suitable emulsions can be comprised of two immiscible liquids such as an aqueous liquid or gelled liquid and a hydrocarbon.

Suitable viscoelastic surfactant gels include an aqueous base fluid and a suitable surfactant that is capable of imparting viscoelastic properties to an aqueous fluid. Example of suitable surfactants can be found in U.S. Pat. No. 8,012,914, the entire disclosure of which is hereby incorporated by reference. The surfactants may be zwitterionic, cationic, anionic, or amphoteric in nature, and comprise any number of different compounds, including methyl ester sulfonates (as described in U.S. Patent Publication Nos. 2006/0180308, 2006/0180309, 2006/0181310 and 2006/0183646, the entire disclosures of which are hereby incorporated by reference), betaines, modified betaines, sulfosuccinates, taurates, amine oxides, ethoxylated fatty amines, quaternary ammonium compounds, derivatives thereof, and combinations thereof. The term "derivative" is defined herein to include any compound that is formed, for example, by replacing one atom in one of the listed compounds with another atom or group of atoms, ionizing one of the listed compounds, or creating a salt of one of the listed compounds. The surfactant should be present in a surfactant gel of the present invention in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.1% to about 20% (or from 2% to 10%) by volume of the surfactant gel.

Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset there between. Examples of suitable invert emulsions include those disclosed in U.S. Pat. Nos. 5,905,061, 5,977,031, 6,828,279, 7,534,745, 7,645,723, and 7,696,131, the entire disclosures of which are hereby incorporated by reference. It should be noted that for water-in-oil and oil-in-water emulsions, any mixture of the above may be used including the water being and/or comprising an aqueous-miscible fluid Proppant Particulates Proppants suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. In some embodiments, the proppant particulates range from about 10 to about 70 mesh with preferred size distributions being 10-20 mesh, 20-40 mesh, 40-60 mesh, or 50-70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In certain embodiments, the particulates may be present in the first treatment fluids of the present invention in an amount in the range of from about 0.5 pounds per gallon ("ppg") to about 30 ppg by volume of the treatment fluid Swellable Particulates Swellable particulates suitable for use in the present invention may be placed in the treatment fluid placed into a fracture and then contacted with a swelling fluid so the swellable particulates swell or expand once in the fracture. Suitable swellable particulates comprise swellable elastomer compositions. In some embodiments, the swellable particulates may comprise a swellable elastomer in combination with a filler material.

Examples of suitable swellable elastomer can be found in U.S., Patent Publication No. 2008/0017376, the entire disclosure of which is hereby incorporated by reference. Typical examples of swellable elastomer materials include: natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulfonated polyethylene, ethylene acrylate rubber, epichlorohydrin ethylene oxide copolymer, ethylene propylene rubber, ethylene propylene diene terpolymer rubber, ethylene vinyl acetate copolymer, flourosilicone rubbers, silicone rubbers, fluoro rubber, and combinations thereof.

The mean particulate size of the swellable elastomer (before swelling occurs) generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

While particulates made solely from the elastomers described above may be used, in some embodiments, the methods of the present invention comprise a solid particulate that has been coated with a swellable elastomer. Unless particularly called out here, where the methods refer to "swellable particles," the disclosure should be read as referring to a particle made solely from the elastomer, a solid particle coated with elastomer, or a combination there.

Where coated particulates are used, the size and shape characteristics remain as described above for swellable elastomer particulates. As used herein the term coated does not imply any particular coverage of the solid particulate with a swellable elastomer composition. Moreover, the swellable elastomer may be coated with the swellable elastomer using any suitable method. For example they may be coated on-the-fly at the well site. In embodiments in which the swellable elastomer is placed onto a solid particulate, the elastomer is generally present in an amount ranging from about 0.1% to about 10% by weight solid particulates. Where swellable elastomer coatings are used, the underlying particulate may be any particulate known for use as a proppant particulate, as described above.

Consolidating Agents

In some embodiments, the swellable particulates, the proppant particulates, or both may be coated with a consolidating agent.

Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicone-based resins, and binders. Combinations and/or derivatives of these also may be suitable. Nonlimiting examples of suitable non-aqueous tackifying agents may be found in U.S. Pat. Nos. 5,853,048; 5,839,510; and 5,833,000 as well as U.S. Patent Application Publication Nos. 2007/0131425 and 2007/0131422 the entire disclosures of which are herein incorporated by reference. Nonlimiting examples of suitable aqueous tackifying agents may be found in U.S. Pat. Nos. 5,249,627 and 4,670,501 as well as U.S. Patent Application Publication Nos. 2005/0277554 and 2005/0274517, the entire disclosures of which are herein incorporated by reference. Nonlimiting examples of suitable crosslinkable aqueous polymer compositions may be found in U.S. Patent Application Publication Nos. 2010/0160187 and 2011/0030950 the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication Nos. 2010/0212898 and 2008/0006405, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0280210, 2010/0179281, and 2010/0212898 the entire disclosures of which are herein incorporated by reference. Nonlimiting examples of suitable binders may be found in U.S. Pat. Nos. 8,003,579; 7,825,074; and 6,287,639 as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

Methods of the Present Invention

In some embodiments, proppant particles may be present in a treatment fluid for use in the present invention in an amount in the range of from about 0.1 pounds per gallon ("ppg") to about 15 ppg by volume of the treatment fluid. In some embodiments, swellable elastomers may be present in a treatment fluid for use in the present invention in an amount in the range of from about 0.1 ppg to about 15 ppg by volume of the treatment fluid. In other embodiments, the combination of proppant particulates and swellable elastomers may be present in a treatment fluid for use in the present invention in an amount in the range of from about 0.1 ppg to about 15 ppg by volume of the treatment fluid.

Some embodiments of the present invention provide methods of propping a subterranean fracture comprising: providing a first treatment fluid that comprises proppant and a second treatment fluid that comprises swellable particulates; alternating the placement of the first treatment fluid and the second treatment fluid into a fracture within a low closure stress formation. In some embodiments the second (swellable) treatment fluid may be placed into the fracture before the first (proppant) treatment fluid, or vice versa. In these embodiments, the first (proppant) and second (swellable) fluids may be placed into the formation alternating only once (that is placement of the first once and then the second once) or may be alternated multiple times (that is, placement of, for example, second-first-second-first-second-first). One of skill in the art will recognize that the number of alterations may be selected based on the needs of the individual treatment being performed. Moreover, while the treatment fluids are alternated, they need not be equal in volume. That is, the treatment may include the placement of a volume of the first treatment fluid followed by the placement of only half the volume of the second treatment fluid, or vice versa.

Other embodiments of the present invention provide methods of propping a subterranean fracture comprising: providing a first treatment fluid that comprises no proppant and a second treatment fluid that comprises swellable particulates; alternating the placement of the first treatment fluid and the second treatment fluid into a fracture within a low closure stress formation. In some embodiments the second (swellable) treatment fluid may be placed into the fracture before the first (no proppant) treatment fluid, or vice versa. In these embodiments, the first (no proppant) and second (swellable) fluids may be placed into the formation alternating only once (that is placement of the first once and then the second once) or may be alternated multiple times (that is, placement of, for example, second-first-second-first-second-first). One of skill in the art will recognize that the number of alterations may be selected based on the needs of the individual treatment being performed. Moreover, just as above, while the treatment fluids are alternated, they need not be equal in volume.

Other embodiments of the present invention provide methods of propping a subterranean fracture comprising: providing a first treatment fluid that is proppant-free and a second treatment fluid that comprises swellable particulates; alternating the placement of the first treatment fluid and the second treatment fluid into a fracture within a low closure stress formation. In some embodiments the second (swellable) treatment fluid may be placed into the fracture before the first (proppant-free) treatment fluid, or vice versa. In these embodiments, the first (proppant-free) and second (swellable) fluids may be placed into the formation alternating only once (that is placement of the first once and then the second once) or may be alternated multiple times (that is, placement of, for example, second-first-second-first-second-first). One of skill in the art will recognize that the number of alterations may be selected based on the needs of the individual treatment being performed. Just as above, while the treatment fluids are alternated, they need not be equal in volume.

Still other embodiments of the present invention provide methods of propping a subterranean fracture comprising: providing a treatment fluid that comprises both proppant and swellable particulates; and placing the treatment fluid into a fracture within a low closure stress formation. In these embodiments, the amount of proppant may be the same, less than, or greater than the amount of swellable particulates.

To facilitate a better understanding of the present invention, the following examples of preferred or representative embodiments are given. In no way should the following examples be read to limit, or to define, the scope of the invention.

EXAMPLES

A treatment solution was prepared by diluting 5% v/v of aqueous-based tackifier SANDWEDGE® ABC (commercially available from Halliburton Energy Services, Inc. of Houston, Tex.) and fresh water containing 2% v/v CLA-WEB® clay stabilizer (commercially available from Halliburton Energy Services, Inc. of Houston, Tex.).

A shale sample was immersed in a stirred beaker of the treatment solution for 5 minutes, which simulates the exposure of fracture faces to a treatment fluid comprising a tackifier. The shale sample was removed and immersed in a beaker of tap water containing 0.2% v/v CLA-WEB® clay stabilizer and 5% w/v OK#1 sand (proppant). This suspension was stirred enough to cause the proppant particles to circulate, which stimulates the introduction of proppant particles into a tackifier treated formation. The shale sample was removed for SEM imaging.

Figure 1B:
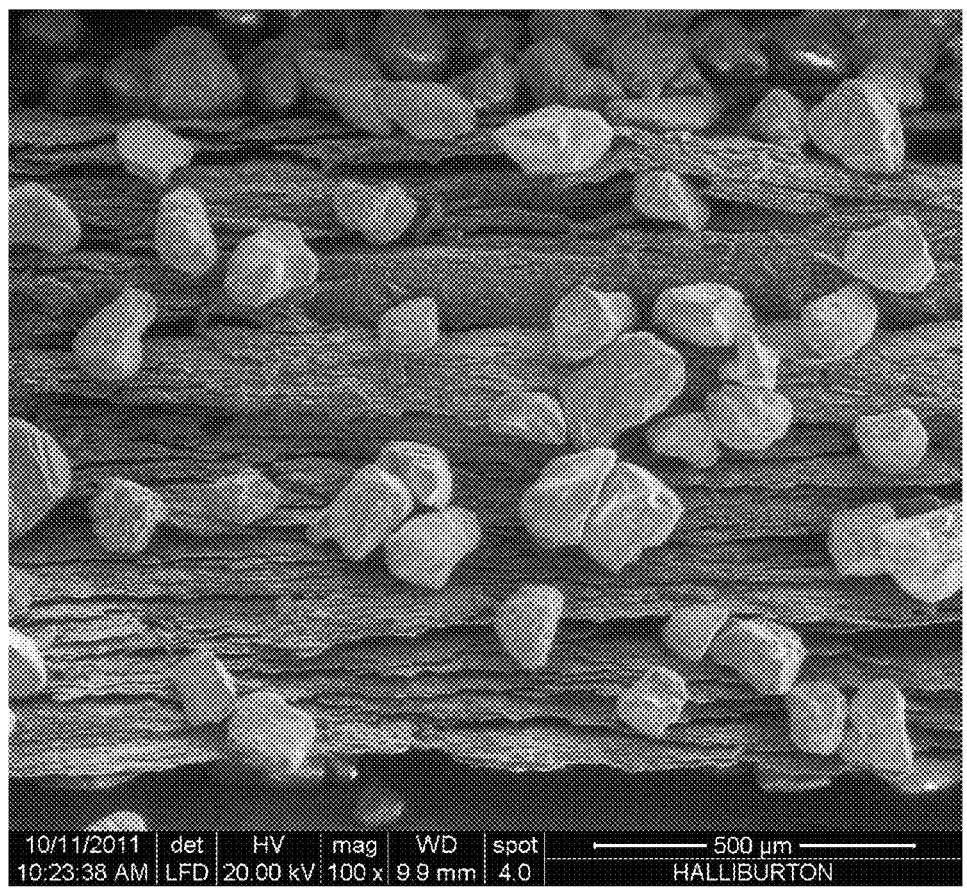
Figure 1C:
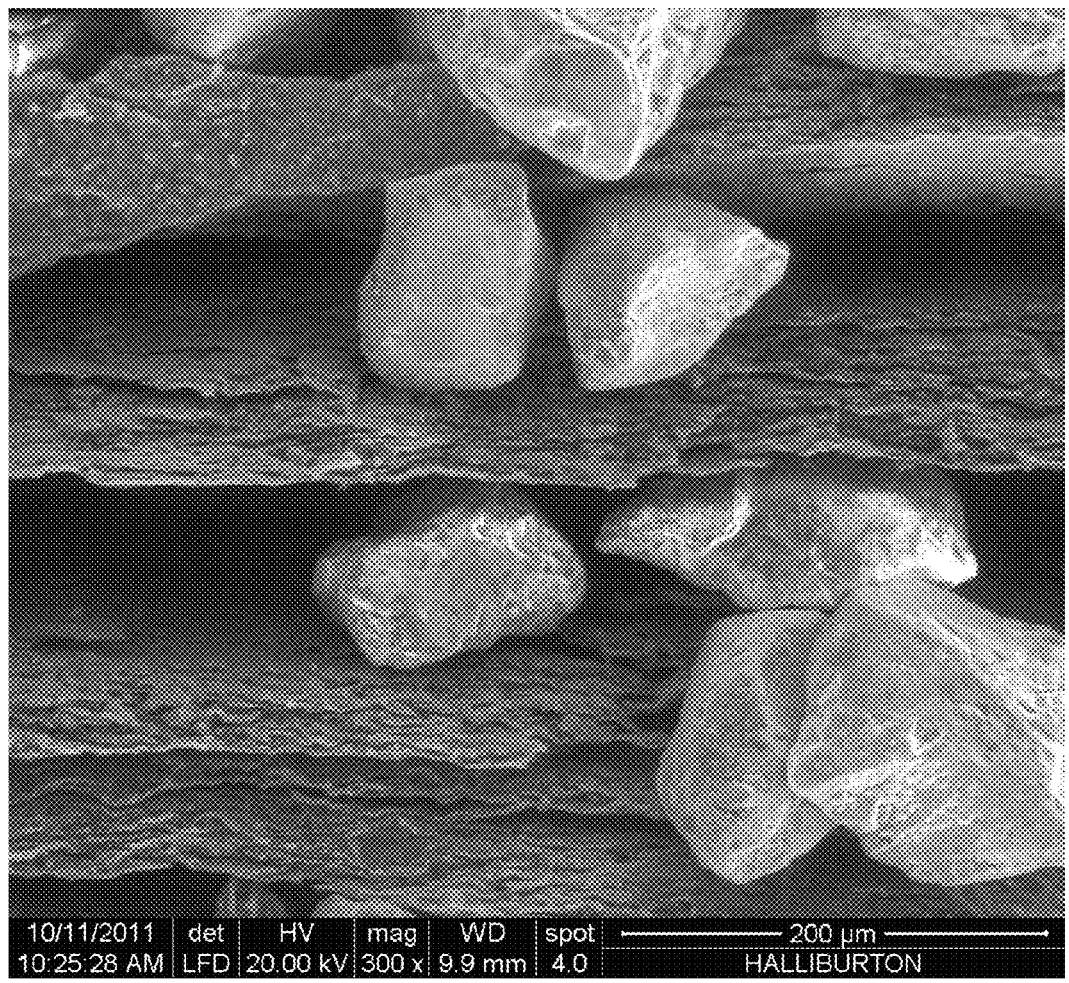

FIGS. 1A-C provide SEM images perpendicular to the bedding planes of the shale after exposure to the proppant particles. Specifically, FIGS. 1A-C show, at increasing magnifications respectively, the adhesion of larger proppant particles to the sides of the bedding planes without, in some instances, support from a lower bedding plane. Further, some of the smaller proppant particles are between bedding planes and appear to be adhered, in some instances, to the upper bedding plane. These figures demonstrate that the particles can be placed not only into the fracture faces but also the layers (i.e., bedding planes) of the formation, as best illustrated in FIG. 1C.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising an aqueous tackifying agent;
providing a first treatment fluid that comprises a plurality of first proppant;
providing a second treatment fluid that comprises swellable elastomer particulates wherein the swellable elastomer is selected from the group consisting of: natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulfonated polyethylene, ethylene acrylate rubber, epichlorohydrin ethylene oxide copolymer, ethylene propylene rubber, ethylene propylene diene terpolymer rubber, ethylene vinyl acetate copolymer, flourosilicone rubbers, silicone rubbers, fluoro rubber, and combinations thereof;
placing the treatment fluid comprising the aqueous tackifying agent into a fracture within a shale formation having a layered bedding plane structure and having closure stresses less than about 2,000 psi,
wherein the treatment fluid is placed into the fracture having the layered bedding plane structure at a pressure sufficient to hold open the fracture having the layered bedding plane structure; and then,
alternating the placement of the first treatment fluid and the second treatment fluid into the fracture having the layered bedding plane structure such that the aqueous tackifying agent adheres the swellable elastomer particulates to the sides of the layered bedding plane structure; and
releasing the pressure and expanding the swellable elastomer particulates adhered to the sides of the layered bedding plane structure such that they force apart the layers of the layered bedding plane structure.

2. The method of claim 1 wherein the first treatment fluid is placed into the fracture before the second treatment fluid.

3. The method of claim 1 wherein the second treatment fluid is placed into the fracture before the first treatment fluid.

4. The method of claim 1 wherein the plurality of first proppant, the swellable elastomer particulates, or both are coated with a consolidating agent.

5. The method of claim 1 wherein the swellable elastomer particulates are selected from the group consisting of: swellable elastomer particles, proppant coated with swellable elastomer, or a combination thereof.

6. The method of claim 1 wherein the plurality of first proppant is coated with a consolidating agent.

* * * * *